US008854357B2

(12) United States Patent
Chauvin

(10) Patent No.: US 8,854,357 B2
(45) Date of Patent: Oct. 7, 2014

(54) PRESENTING SELECTORS WITHIN THREE-DIMENSIONAL GRAPHICAL ENVIRONMENTS

(75) Inventor: Joseph Wayne Chauvin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 13/014,790

(22) Filed: Jan. 27, 2011

(65) Prior Publication Data

US 2012/0194503 A1 Aug. 2, 2012

(51) Int. Cl.
*G06T 15/00* (2011.01)
*G06F 3/0481* (2013.01)
*G06F 3/0482* (2013.01)

(52) U.S. Cl.
CPC .......... *G06F 3/0482* (2013.01); *G06F 3/04815* (2013.01); *G06F 2203/04804* (2013.01)
USPC ............ 345/419; 345/422; 382/283; 715/378

(58) Field of Classification Search
USPC ..................... 345/419, 422; 382/283; 715/738
See application file for complete search history.

(56) References Cited

U.S. PATENT DOCUMENTS

| | | | |
|---|---|---|---|
| 5,264,836 A | 11/1993 | Rubin | |
| 5,359,703 A | 10/1994 | Robertson et al. | |
| 6,175,652 B1 * | 1/2001 | Jacobson et al. | 382/216 |
| 6,414,677 B1 * | 7/2002 | Robertson et al. | 345/419 |
| 7,043,701 B2 | 5/2006 | Gordon | |
| 7,532,213 B2 * | 5/2009 | Sfarti | 345/423 |
| 7,643,025 B2 * | 1/2010 | Lange | 345/419 |
| 7,765,488 B2 | 7/2010 | Pagan | |
| 8,216,190 B2 * | 7/2012 | Gartstein et al. | 604/173 |
| 8,400,450 B2 * | 3/2013 | Lantin | 345/427 |
| 2005/0114373 A1 | 5/2005 | Kulp et al. | |
| 2006/0125789 A1 | 6/2006 | Tu et al. | |
| 2007/0067798 A1 | 3/2007 | Wroblewski | |
| 2008/0122839 A1 | 5/2008 | Berglund et al. | |
| 2009/0085911 A1 * | 4/2009 | Fitzmaurice et al. | 345/419 |
| 2010/0033429 A1 | 2/2010 | Bescos | |
| 2010/0085423 A1 * | 4/2010 | Lange | 348/46 |
| 2011/0267437 A1 * | 11/2011 | Abeloe | 348/51 |
| 2012/0013613 A1 * | 1/2012 | Vesely | 345/419 |
| 2012/0044249 A1 * | 2/2012 | Mashitani et al. | 345/419 |

OTHER PUBLICATIONS

PCT International Search Report, mailed Aug. 28, 2012, 8 pp.
Azari, et al., "Stereo 3D Mouse Cursor: A Method for Interaction with 3D Objects in a Stereoscopic Virtual 3D Space," International Journal of Digital Multimedia Broadcasting, Apr. 30, 2009, 11 pp., vol. 2010, Article ID 419493, Hindawi Publishing Corporation, Edmonton, Alberta, Canada.
"2d Mouse Coordinates to 3d," Published on: Apr. 2007, Available at: http://social.msdn.microsoft.com/forums/en-US/wpf/thread/4d1b466b-b743-4388-a16e-cc09425586b2/, 11 pp.
Adams, Mike, "The Top Ten Technologies: #8 Computer / Human Interface Systems," Published on: Jul. 14, 2004, Available at: http://www.naturalnews.com/000304.html, 7 pp.

* cited by examiner

*Primary Examiner* — Kimbinh T Nguyen
(74) *Attorney, Agent, or Firm* — Shook, Hardy & Bacon L.L.P.

(57) ABSTRACT

Computer-readable media, computer systems, and computing devices facilitate presentation of selectors in three-dimensional graphical environments. In embodiments, an obscured region being obscured by an element appearing in front of one or more elements within a three-dimensional graphical environment is determined. In cases that a selector (e.g., a cursor) is located within the obscured region, the selector is presented in accordance with a depth position of the element associated with the obscured region. Such a depth position can indicate a distance at which the element is intended to appear relative to a display screen.

19 Claims, 11 Drawing Sheets

PRESENTING SELECTORS WITHIN THREE-DIMENSIONAL GRAPHICAL ENVIRONMENTS

BACKGROUND

Three-dimensional stereo technology is becoming increasingly popular. For example, movies and live television sports broadcasts are more frequently utilizing three-dimensional stereo technology. A common technique used to generate three-dimensional stereo content enables objects to appear in front of a display screen such that a viewer feels closer to the action.

In many cases, a selector, such as a cursor, is displayed in three-dimensional environments. Displaying a selector using two-dimensional technology, however, can result in the selector appearing behind objects displayed in three-dimensions. Further, in some cases, because objects in a three-dimensional environment appear protruded from the display screen, the protruded object can obscure a portion of the background content such that a viewer may be unable to view the selector. For example, when a selector is displayed coplanar with a display screen or background content and a particular object is displayed in accordance with a depth position that results in the object appearing in front of the display screen or background content, the selector may not be apparent from a depth perception point-of-view of the viewer (e.g., in connection with a left-eye view, a right-eye view, or a combination thereof) as the selector may be positioned behind the object or be visually blocked by the object. By way of further example, even in cases that a selector is always shown in front (as in many mouse handling solutions) and the cursor is rendered coplanar to the screen, a strange visual effect can result in that the selector is drawn on top but appears as though it should be behind in accordance with a user's depth perception thereby leading to an inaccurate depth perception effect.

An inability to properly view a selector can result in inaccurate and ineffective selection of items presented within a display screen. For instance, a user may initiate a select function and thereby inadvertently select an item that was not visible to the user (i.e., the item is hidden by an object appearing in front of the display screen or background content).

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

According to embodiments of the invention, a depth position of a selector (e.g., a cursor) is adjusted within a three-dimensional graphical environment such that the selector is apparent to a viewer. In this regard, the selector is not "hidden" or obscured by an element appearing projected relative to the display screen or background. For example, a selector that is positioned directly behind an element when presented in a two-dimensional format is provided with a depth position that matches or corresponds with such an element. In this way, the selector will appear to a viewer in three dimensions. By way of further example, a selector that is located within an obscured region can be provided with a depth position that matches or corresponds with an element that causes an obscured region. Accordingly, a selector located within an obscured region can be recognized by a viewer. An obscured region can refer to an area within which content, such as a selector presented in a two-dimensional format, is not apparent to a user, or is only apparent to a user from a perspective of one eye, due to an element being presented with a depth position that projects the element away from the display screen or background content such that a portion of content may be blocked from a left and/or right eye perspective of a viewer.

BRIEF DESCRIPTION OF THE DRAWINGS

Embodiments of the invention are described in detail below with reference to the attached drawing figures, wherein.

DETAILED DESCRIPTION

Figure 1:
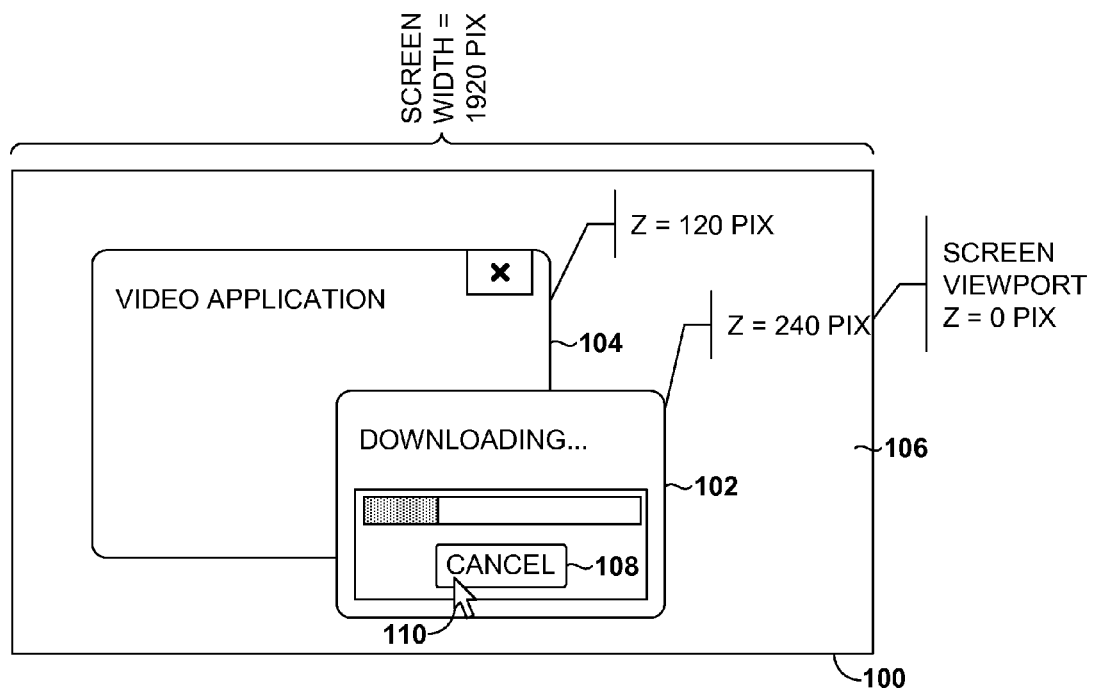
FIG. 1 depicts an illustrative display screen of user interface elements at different depth positions, in accordance with embodiments of the present invention.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Three-dimensional effects are becoming increasingly popular in graphical three-dimensional environments. A graphical three-dimensional environment or a three-dimensional environment, as used herein, refers to a display screen that provides objects in three-dimensions. Graphical three-dimensional environments are displayed using a display screen associated with, for example, a computing device, a television, a set-top box, a gaming system, etc.

Three-dimensional environments are generally generated by overlaying elements or objects over other elements, such as background content, in a three-dimensional space. That is, overlay elements or user interface elements are oftentimes provided over background content or other elements to provide a three-dimensional effect, for example, by producing left and right stereo images at an appropriate apparent depth that will be provided to the left and right eye via various stereoscopic display technologies. In some cases, overlay elements (e.g., two-dimensional overlay elements) are provided as an overlay to background content (e.g., media content) in an effort to provide a three-dimensional effect of the overlay element relative to the background content. An overlay element or element may be a two-dimensional element or a three-dimensional element that overlays background content and/or any other element. A two-dimensional overlay element refers to any element that is two-dimensional and can overlay background content and/or any other element, or can be composited therewith. A three-dimensional overlay element refers to any element that is three-dimensional and can overlay background content and/or any other element, or can be composited therewith.

An element may be any element or object that is or can be presented on a display screen. By way of example only, and without limitation, an element may be text, an image(s), a photograph(s), a window view(s), a menu(s), a dialogue box, background content, a combination thereof, or the like. Background content, as used herein, refers to any type of visual media that can be composited with or overlaid by one or more elements. Background content may be media content, a video, an image, a photograph, a graphic, a window view, a desktop view, or the like. In one embodiment, background content is in a two-dimensional form. Alternatively, in another embodiment, background content is in a three-dimensional form (e.g., three-dimensional stereo). In some cases, at least a portion of background content is coplanar with the display screen, that is, has a depth position of zero.

In embodiments of the present invention, an overlay element may be an enhanced element (e.g., a modified two-dimensional element) that overlays background content, such as three-dimensional media content, to provide a three-dimensional effect of the enhanced element relative to the background content. In this regard, the enhanced element appears to be positioned at a particular depth in front of the background content, or appears closer to a viewer than at least a portion of the background content. Even when the background content is provided in a three-dimensional format, embodiments of the present invention enable a three-dimensional effect of the enhanced element relative to the background content in that the enhanced element appears in front of at least a portion, or even all, of the three-dimensional background content. Enhanced elements are elements that are modified, for example, in size and/or position, to provide a three-dimensional effect of the element relative to the background content. Enhanced elements are described in more details in U.S. application Ser. No. 12/904,548, filed Oct. 14, 2010 and entitled "Presenting Two-Dimensional Elements in Three-Dimensional Stereo Applications," which is incorporated by reference herein.

In embodiments, to generate a three-dimensional effect of an element relative to background content, a left-eye perspective view and a right-eye perspective view is generated such that the elements are positioned to appear in front of the background content. To provide a three-dimensional effect, in some embodiments, a composite media that includes an enhanced element associated with a left-eye view and an enhanced element associated with a right-eye view is generated. In this regard, the enhanced element associated with the left-eye view and the enhanced element associated with the right-eye view are included in a same portion of the media content, such as a particular frame of media content. Alternatively, a composite media that includes an enhanced element associated with a left-eye view and a separate composite media that includes an enhanced element associated with a right-eye view can be generated. In such a case, the composite media associated with the left-eye view and the composite media associated with the right-eye view may include the same portion of media content (i.e., the same frame of media content repeated in two different composite media).

A selector rendered in connection with a three-dimensional environment, however, may have an improper depth appearance as the selector may not appear in front of a particular element. A selector, as used herein, refers to any selector or pointer that can be used to select a selectable item within a display screen. Accordingly, a selector might be a cursor, a user digit (e.g., a finger), etc. In some embodiments, a selector indicates a position within a display screen. For instance, a cursor displayed on a display screen represents a location thereof. A selectable item refers to any item that can be selected, for example based on user input and, upon selection, may result in performance of an action or an event associated with the selectable item. User input may be provided using any method. For example, user input may be provided by a user placing a cursor over a selectable item and providing an indication (e.g., click a button, perform a gesture, etc.) to select the item. By way of further example, user input may be provided by a user performing a touch event in association with a selectable item (e.g., touch a selectable item with an item or appear to touch a selectable item with an item).

By way of example only and with initial reference to FIG. 1, FIG. 1 illustrates a display view 100 with user interface elements at different depth positions. Illustrative view 100 of FIG. 1 shows a screen with a first window 102 overlapping a second window 104, both of which are displayed over background content 106 (e.g., a desktop view). The first window 102 includes a selectable item 108 that can be selected by the selector 110. As illustrated in FIG. 1, the first window 102 has a depth position of 240 pixels, and the second window 104 has a depth position of 120 pixels. Accordingly, a three-dimensional effect is generated in that the first window 102, including the selectable item 108, appears in front of the second window 104.

Figure 2:
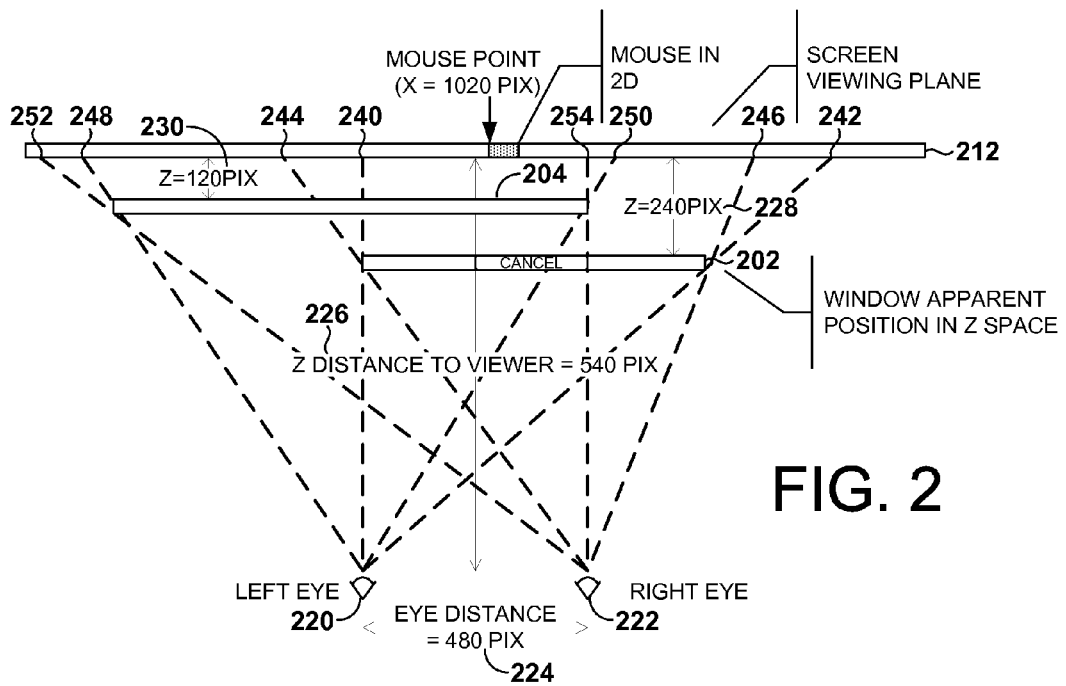
FIG. 2 illustrates a first representation of a top view of a viewer's perception of a three-dimensional environment, according to embodiments of the present invention.

FIG. 2 illustrates a representation of a top view of a viewer's perception of the three-dimensional environment of FIG. 1. In particular, FIG. 2 illustrates a top view of the projection from the left eye onto the display screen surface and from the right eye onto the display screen surface in connection with viewing the first window 202 and the second window 204. As illustrated, a viewer's left eye 220 (left eye position) and a viewer's right eye 222 (right eye position) are positioned a particular distance 224 (eye distance) apart from one another. The visual depth 226 identifies the distance of the viewer's eyes from the display screen 212 (z distance to viewer). As is illustrated in FIG. 2, positioning the first window 202 away from the display screen 212 results in a visual perspective from the left eye 220 that is different from the right eye 222 when projecting boundaries back onto the display screen 212. Because a three-dimensional effect is desired that portrays the first window 202 as being at a depth position 228 away from the display screen 212 and because the first window 202 cannot be rendered in space, FIG. 2 illustrates projection of a viewer's left eye line of sight extended to the display screen 212 at points 240 and 242 and the viewer's right eye line of sight extended to the display screen 212 at points 244 and 246 based on the first window being positioned at the depth position 228. In effect, such a projection results in modified boundaries of the first window 202 for the left and right eye view.

Similarly, as is illustrated in FIG. 2, positioning the second window 204 away from the display screen 212 results in a visual perspective from the left eye 220 that is different from the right eye 222 when projecting boundaries back onto the display screen 212. Because a three-dimensional effect is desired that portrays the second window 204 as being at a depth position 230 away from the display screen 212 and because the second window 204 cannot be rendered in space, FIG. 2 illustrates projection of a viewer's left eye line of sight extended to the display screen 212 at points 248 and 250 and the viewer's right eye line of sight extended to the display screen 212 at points 252 and 254 based on the second window being positioned at the depth position 230. In effect, such a projection results in modified boundaries of the second window 204 for the left and right eye view.

Figure 3:
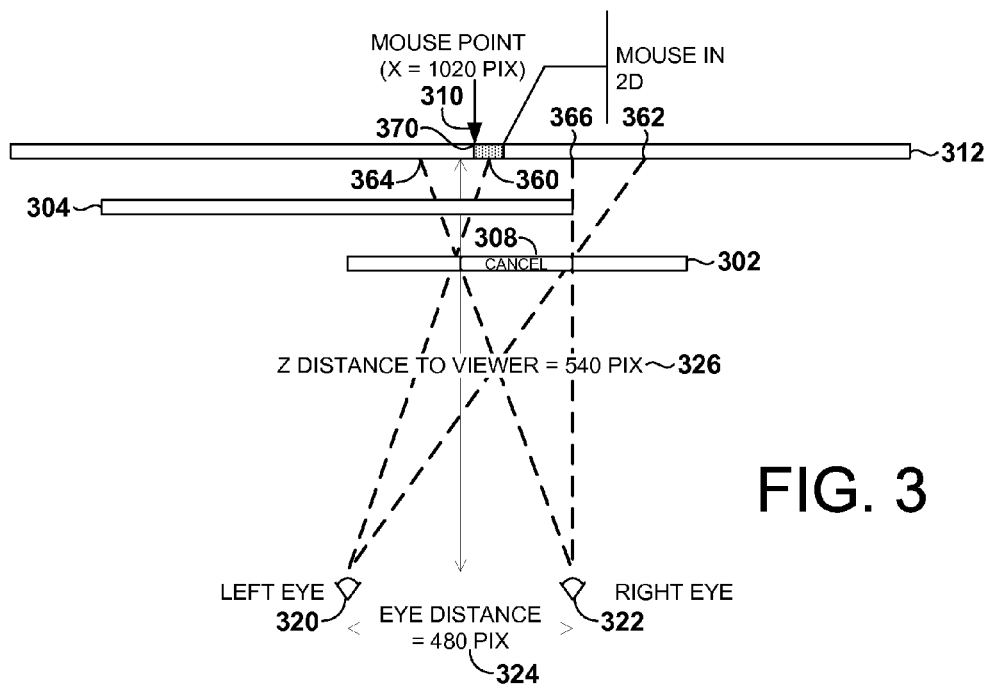
FIG. 3 illustrates a second representation of a top view of a viewer's perception of the three-dimensional environment, according to embodiments of the present invention.

FIG. 3 illustrates another representation of a top view of a viewer's perception of the three-dimensional environment of FIG. 1. FIG. 3 illustrates a top view of the projection from the left eye onto the display screen surface 312 and from the right eye onto the display screen surface 312 in connection with selectable item 308 within the first window 302. As illustrated, a viewer's left eye 320 (left eye position) and a viewer's right eye 322 (right eye position) are positioned a particular distance 324 (eye distance) apart from one another. The visual depth 326 identifies the distance of the viewer's eyes from the display screen 312 (z distance to viewer). As is illustrated in FIG. 3, positioning the first window 302, including the selectable item 308, away from the display screen 312 results in a visual perspective from the left eye 320 that is different from the visual perspective of the right eye 322 of the selectable item 308 when projecting boundaries back to the display screen 312. Because a three-dimensional effect is desired that portrays the selectable item 308 as being at a depth position away from the display screen 312 and because the selectable item 308 cannot be rendered in space, FIG. 3 illustrates projection of a viewer's left eye line of sight extended to the display screen 312 at points 360 and 362 and the viewer's right eye line of sight extended to the display screen 312 at points 364 and 366. In effect, such a projection results in modified boundaries of the selectable item 308.

With further reference to FIG. 3, assume the selector 310 is positioned at point 370 relative to the display screen 312. Because the selector position 370 is realized in two-dimensional space (i.e., at depth position equal to zero), and the first window 302, the second window 304, and the selectable item 308 are realized in three-dimensional space, the selector appears as though positioned behind the windows 302 and 304. In this example, as illustrated in FIG. 3, the selector position 370 is behind the selectable item 308. Accordingly, if the viewer provides an indication to select the selectable item 308 while the selector is in such a selector position 370, the selectable item 308 is selected even though the selector 310 does not appear to be selecting the selectable item 308 from the left-eye perspective. In this regard, because the selector position 370 is outside the modified left boundary 360 and the modified right boundary 362 in association with the left eye perspective of the selectable item 308, the viewer may not realize that he or she is selecting the selectable item 308. That is, in spite of the selector being positioned over the original selectable item 308 (if presented in two-dimensions), when the selectable item 308 is presented in three-dimensional space, the left-eye view shows the appearance of the selector position 370 being to the left of the selectable item as indicated by points 360 and 362. If the user is using the left eye and clicks at the selector position 370, a cancel event will be initiated even though it does not appear to the viewer, via the left eye, that the selector 310 is over the selectable item 308. Further, if the first window 302 is transparent, the selector 310 would also appear to be behind the first window such that the viewer would have the impression of selecting an item behind the first window 302, and not the selectable item 308.

Figure 4A:
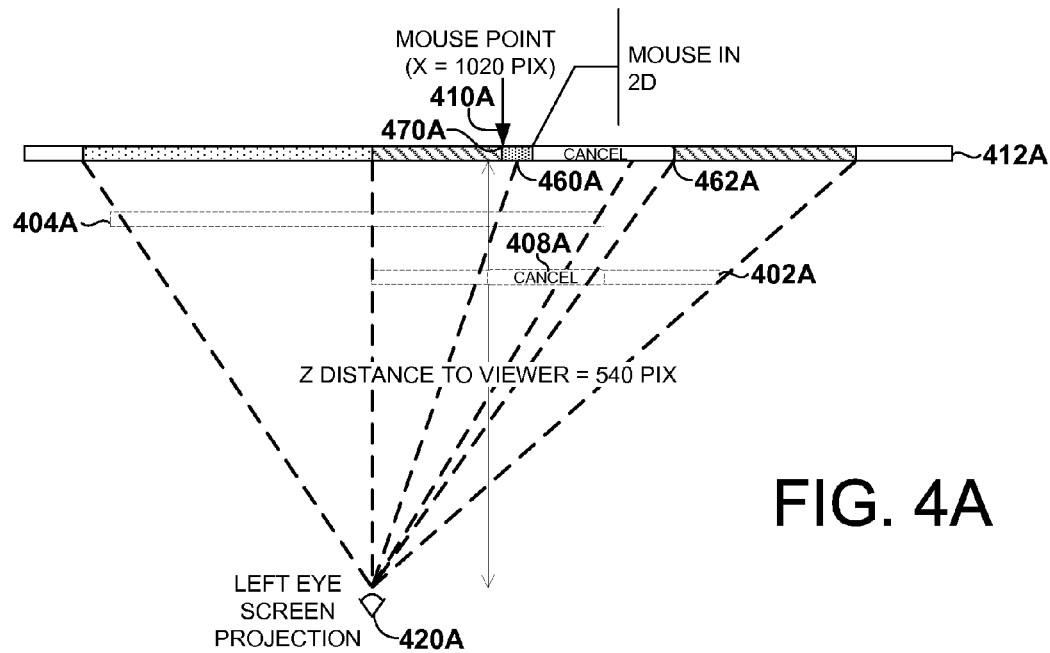
FIG. 4A illustrates a top view from the left-eye view, in accordance with embodiments of the present invention.
Figure 4B:
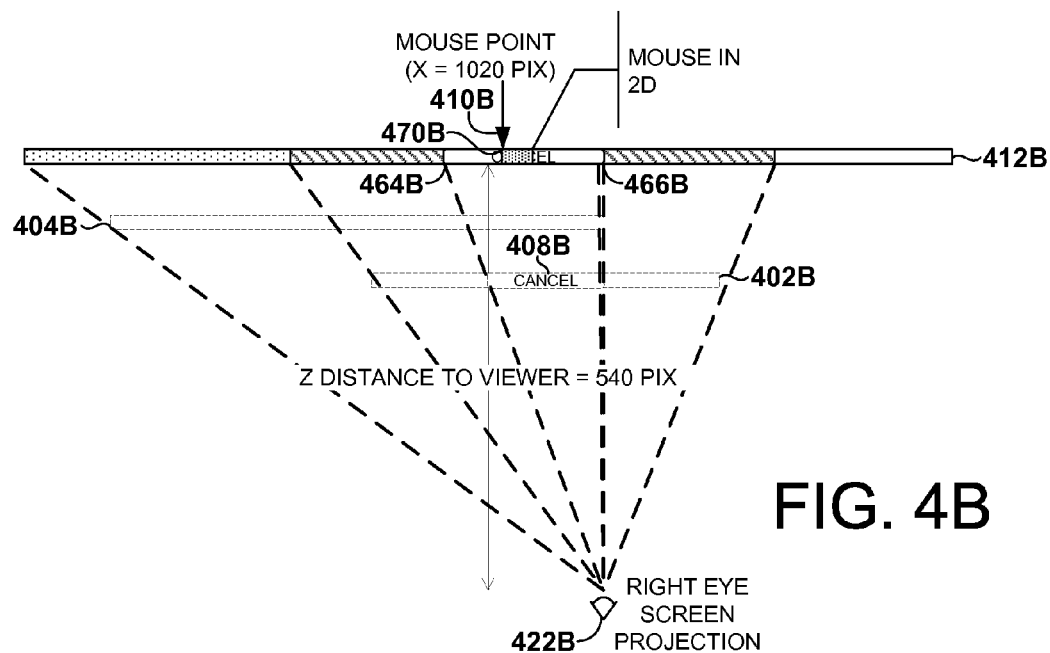
FIG. 4B illustrates a top view from the right-eye view, in accordance with embodiments of the present invention.

FIGS. 4A and 4B illustrate a top view from the left-eye view and the right-eye view, respectively. In particular, FIG. 4A illustrates a projection, from the perspective of the left eye 420A of the first item 402A, the second item 404A, and the selectable item 408A back onto the screen viewing plane 412A. FIG. 4B illustrates a projection, from the perspective of the right eye 422B of the first item 402B, the second item 404B, and the selectable item 408B back onto the screen viewing plan 412B. With initial reference to FIG. 4A, from the perspective of the viewer's left eye 420A, assume that the selector 410A is positioned at selector position 470A and is positioned in alignment with the original selectable item as displayed in a two-dimensional space. From the left eye perspective 420A, however, the selectable item 408A presented in three-dimensional space at a depth position in front of the display screen 412A is projected back to the display screen 412A such that the modified boundaries from the left-eye perspective are located at points 460A (i.e., left boundary) and 462A (i.e., right boundary). As such, in accordance with the left-eye view, the appearance of the selector position 470A is to the left of the selectable item 408A. Accordingly, if a user is only using the left eye to view the selectable item 408A and clicks at the selectable item position 470A, an event associated with the selectable item 408A (e.g., a cancel event) will occur even though it does not appear like the selector 410A is positioned over the selectable item 408A from the perspective of the left eye 420A.

Comparatively, with respect to FIG. 4B, from the perspective of the viewer's right eye 422B, assume that the selector 410B is positioned at selector position 470B and is positioned over the original selectable item as displayed in a two-dimensional space. From the right eye perspective 422B, however, the selectable item 408B presented in three-dimensional space at a depth position in front of the display screen 412B is projected back to the display screen 412B such that the modified boundaries from the right-eye perspective are located at points 464B (e.g., left boundary) and 466B (i.e., right boundary). As such, in accordance with the right-eye view, the appearance of the selector position 470B is over the selectable item 408B (as the selector position 470B falls within the modified boundaries 464B and 466B). Accordingly, if a user is only using the right eye to view the selectable item 408B and clicks at the selectable item position 470B, an event associated with the selectable item 408B (e.g., a cancel event) will occur, as expected by the viewer.

Embodiments of the present invention relate to systems, methods, and computer storage media having computer-executable instructions embodied thereon that facilitate presentation of selectors within three-dimensional environments. In one aspect, embodiments of the invention described herein include computer-readable media having computer-executable instructions for performing a method of facilitating presentation of selectors in three-dimensional graphical environments. The method includes referencing a depth position associated with each element having a horizontal and a vertical position that is the same as a current position of a selector. Each depth position indicates a distance at which the corresponding element is intended to appear relative to a display screen. A largest depth position having a largest depth relative to the display screen is identified. The largest depth position is identified from among the depth positions associated with each element having the horizontal and the vertical position that is the same as the current position of the selector. A selector depth position that corresponds with the largest depth position is designated. The selector depth position indicates a distance at which the selector is intended to appear relative to the display screen.

In a second illustrative embodiment, computer-executable instructions cause a computing device to perform a method of facilitating presentation of selectors in three-dimensional graphical environments. In embodiments, the method includes determining any obscured regions being obscured by an element appearing in front of other elements within a three-dimensional graphical environment. It is identified that a selector is located in one of the obscured regions. A selection functionality of the selector is disabled based on the selector being located in one of the obscured regions. Disabling the selection functionality prevents the selector from initiating selection of any selectable items.

In a third illustrative embodiment, a computerized method for facilitating presentation of selectors in three-dimensional graphical environments. The method includes determining an obscured region being obscured by an element appearing in front of other elements within a three-dimensional graphical environment. It is identified that a selector is located in the obscured region. The selector is presented in accordance with a depth position of the element associated with the obscured region. The depth position indicates a distance at which the element is intended to appear relative to a display screen.

Having briefly described an overview of the present invention, an exemplary operating environment in which various aspects of the present invention may be implemented is described below in order to provide a general context for various aspects of the present invention. Referring to the drawings in general, and to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 5:
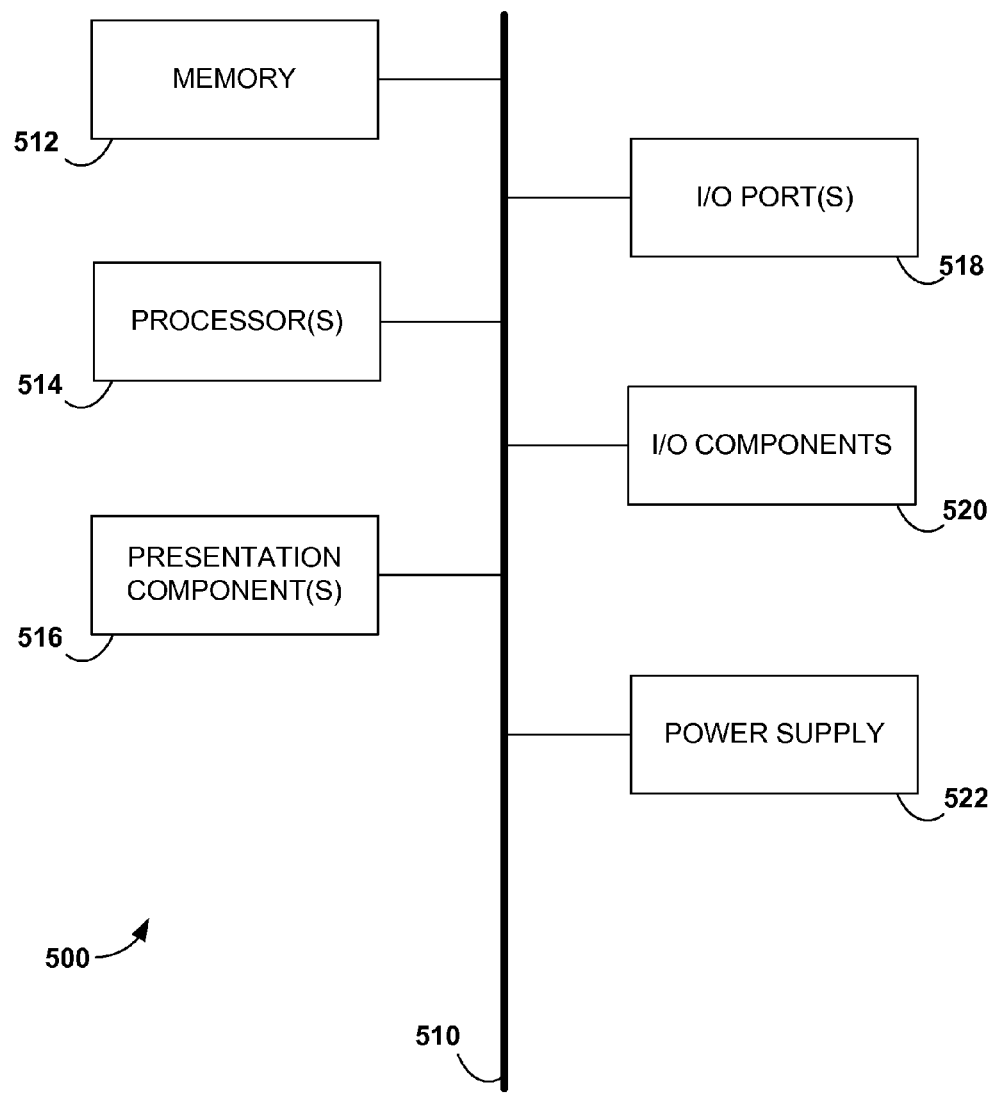
FIG. 5 is a block diagram of an exemplary computing device suitable for implementing embodiments of the invention.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, nonremovable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Figure 6:
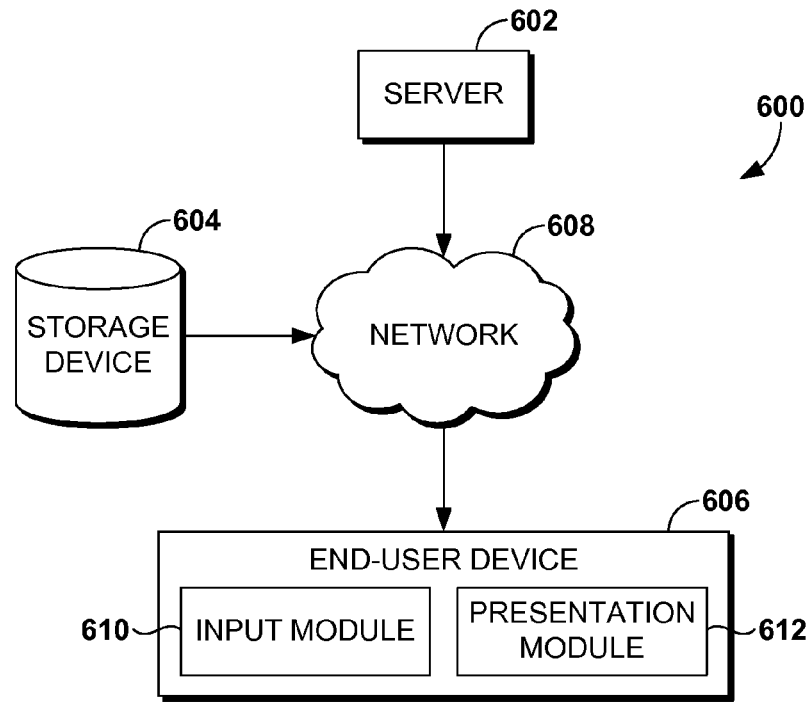
FIG. 6 is a block diagram of an exemplary network environment suitable for use in implementing embodiments of the invention.

With reference to FIG. 6, a block diagram is illustrated that shows an exemplary computing system architecture 600 configured for use in implementing embodiments of the present invention. It will be understood and appreciated by those of ordinary skill in the art that the computing system architecture 600 shown in FIG. 6 is merely an example of one suitable computing system and is not intended to suggest any limitation as to the scope of use or functionality of the present invention. Neither should the computing system architecture 600 be interpreted as having any dependency or requirement related to any single module/component or combination of modules/components illustrated therein.

Computing system architecture 600 includes a server 602, a storage device 604, and an end-user device 606, all in communication with one another via a network 608. The network 608 may include, without limitation, one or more local area networks (LANs) and/or wide area networks (WANs). Such networking environments are commonplace in offices, enterprise-wide computer networks, intranets and the Internet. Accordingly, the network 608 is not further described herein.

The storage device 604 is configured to store information associated with three-dimensional environments. In various embodiments, such information may include, without limitation, elements, element attributes, selectors, obscured regions, and the like. In embodiments, the storage device 604 is configured to be searchable for one or more of the items stored in association therewith. It will be understood and appreciated by those of ordinary skill in the art that the information stored in association with the storage device 604 may be configurable and may include any information relevant to elements, element attributes, selectors, obscured regions, or the like. The content and volume of such information are not intended to limit the scope of embodiments of the present invention in any way. Further, though illustrated as a single, independent component, the storage device 604 may, in fact, be a plurality of storage devices, for instance a database cluster, portions of which may reside on the server 602, the end-user device 606, another external computing device (not shown), and/or any combination thereof.

Each of the server 602 and the end-user device 606 shown in FIG. 6 may be any type of computing device, such as, for example, computing device 500 described above with reference to FIG. 5. By way of example only and not limitation, each of the server 602 and the end-user device 606 may be a personal computer, desktop computer, laptop computer, handheld device, mobile handset, consumer electronic device, a touch screen device, a set-top box, or the like. It should be noted, however, that embodiments are not limited to implementation on such computing devices, but may be implemented on any of a variety of different types of computing devices within the scope of embodiments hereof.

The server 602 may include any type of application server, database server, or file server configurable to perform the methods described herein. In addition, the server 602 may be a dedicated or shared server. One example, without limitation, of a server that is configurable to operate as the server 602 is a structured query language ("SQL") server executing server software such as SQL Server 2005, which was developed by the Microsoft® Corporation headquartered in Redmond, Wash.

Components of server 602 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via a network, e.g., network 608. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 600 is merely exemplary. While the server 602 is illustrated as a single unit, one skilled in the art will appreciate that the server 602 is scalable. For example, the server 602 may in actuality include a plurality of servers in communication with one another. Moreover, the storage device 604 may be included within the server 602 or end-user device 606 as a computer-storage medium. The single unit depictions are meant for clarity, not to limit the scope of embodiments in any form.

As shown in FIG. 6, the end-user device 606 includes an input module 610 and a presentation module 612. In some embodiments, one or both of the modules 610 and 612 may be implemented as stand-alone applications. In other embodiments, one or both of the modules 610 and 612 may be integrated directly into the operating system of the end-user device 606. It will be understood by those of ordinary skill in the art that the modules 610 and 612 illustrated in FIG. 6 are exemplary in nature and in number and should not be construed as limiting. Any number of modules may be employed to achieve the desired functionality within the scope of embodiments hereof.

The user input module 610 is configured, for example, for receiving input of a user selection of a selectable item. Typically, a user selection is input via a user interface (not shown) associated with the end-user device 606, or the like. A user may provide input, for example, via a mouse, a touch solution, a three-dimensional input solution (e.g., Microsoft's Kinect®), or the like. The presentation module 612 of the end-user device 606 is configured for presenting three-dimensional environments. In one embodiment, the presentation module 612 presents a three-dimensional environment utilizing a display device associated with the end-user device 606. Embodiments, however, are not intended to be limited to visual display but rather may also include audio presentation, combined audio/video presentation, and the like.

The end-user device 606 can be any kind of computing device capable of allowing a viewer to view three-dimensional environments. Accordingly, the end-user device 606 includes a display screen for viewing three-dimensional environments. For example, in an embodiment, the end-user device 606 can be a computing device such as computing device 500, as described above with reference to FIG. 5. In embodiments, the end-user device 606 can be a personal computer (PC), a laptop computer, a workstation, a mobile computing device, a PDA, a cell phone, a television, a set-top box, a touch screen device, or the like.

The end-user device 606 may be capable of displaying three-dimensional stereo content. Such an end-user device 606 may utilize any three-dimensional display technology. Examples of three-dimensional display technologies include, but are not limited to, televisions using active and passive polarizing and/or shutter glasses, computer displays with active shutter glasses, anaglyphic (red-blue or other color combinations), stereo pair viewers, auto-stereoscopic glasses free technology, retinal projection technologies, holographic, or any other three-dimensional display technology.

In embodiments, the end-user device 606 utilizes an enhanced composite media to provide a three-dimensional effect to a viewer. For instance, an end-user device 606 receiving two distinct surfaces, such as an enhanced composite media associated with a left eye view and an enhanced composite media associated with a right eye view, the end-user device 606 utilizes the two distinct surfaces to provide a three-dimensional effect of the enhanced element relative to the background content. Alternatively, an end-user device 606 receiving a single surface, such as an enhanced composite media including an enhanced element associated with a left eye and an enhanced element associated with a right eye, can utilize the single surface to provide a three-dimensional effect of the enhanced element relative to the background content.

Figure 7:
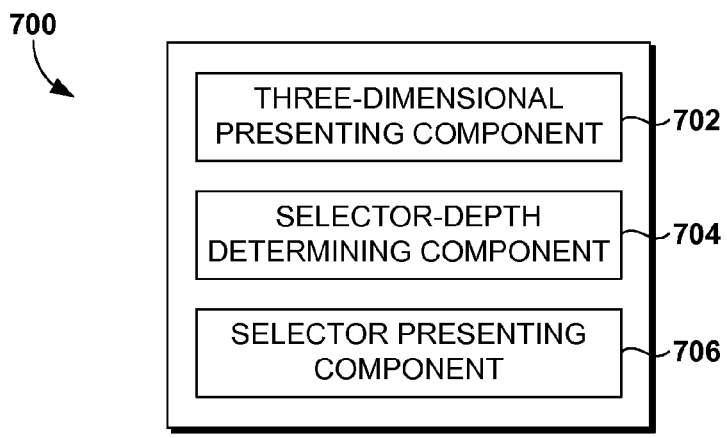
FIG. 7 illustrates an exemplary computing system for presenting selectors in three-dimensional environments, according to embodiments of the present invention.

FIG. 7 illustrates an exemplary computing system 700 for presenting selectors in three-dimensional environments. As shown in FIG. 7, an exemplary computing system 700 includes a three-dimensional presenting component 702, a selector-depth determining component 704, and a selector presenting component 706. In some embodiments, one or more of the illustrated components may be implemented as stand-alone applications. In other embodiments, one or more of the illustrated components may be integrated directly into the operating system of the server 602, a cluster of servers (not shown), and/or the end-user device 606. It will be understood by those of ordinary skill in the art that the components illustrated in FIG. 7 are exemplary in nature and in number and should not be construed as limiting. Any number of components may be employed to achieve the desired functionality within the scope of embodiments hereof. Further, components may be located on any number of servers or computing devices. By way of example only, the three-dimensional presenting component 702 and the selector presenting component 706 may reside on the end-user device 606 of FIG. 6, while the selector-depth determining component 704, or a portion thereof, may reside on a server or cluster of servers.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The three-dimensional presenting component 702 is configured to present three-dimensional environments. A three-dimensional environment includes multiple elements presented to provide a three-dimensional effect. By way of example, a three-dimensional environment may include background content (e.g., two-dimensional or three-dimensional) with one or more overlay elements. In embodiments, the three-dimensional presenting component 702 may reference content to present in three dimensions. Such content may be referenced by receiving, retrieving, or accessing content from a content provider. A content provider may provide content, for instance, in response to a request from the three-dimensional presenting component 702 or a request from a viewer device based on a viewer request. For example, a viewer of a viewer device may provide a selection or otherwise indicate a desire to view particular media content, for example, particular three-dimensional media content. Such media content may be stored in an environment in which content can be stored such as, for example, a database, a computer, or the like. A content provider can reference the stored media content and, thereafter, communicate the media content to the three-dimensional presenting component 702, viewer device, or other component (e.g., graphics engine). Such content provided by a content provider may be three-dimensional content, background content, overlay elements (e.g., text, an image, a photograph, a window view, a menu), composited content (e.g., background content composited with one or more overlay elements), combinations thereof, or the like.

In some embodiments, the three-dimensional presenting component 702 may display a three-dimensional environment as referenced, for example, for a content provider. Alternatively, the three-dimensional presenting component 702 may be configured to perform calculations, composite one or more elements over background content, or perform other functionality to present three-dimensional environments.

The content provider may also provide element attributes, enhanced element attributes, and/or visual attributes. Such attributes may be used by the three-dimensional presenting component 702, or another component, such as the selector-depth determining component 704, to perform calculations, generate compositions, etc.

One or more element attributes may be communicated with (e.g., as metadata) or separate from a corresponding element. An element attribute refers to any attribute that describes, indicates, or characterizes a position and/or a size of an original element. An element attribute may be a horizontal position, a vertical position, a depth position, a width, a height, a left boundary, a right boundary, or the like of an element (e.g., a two-dimensional element). A horizontal position refers to a horizontal position or desired horizontal position (e.g., along the x-axis) of a point of an element relative to the display screen or background content. For example, a horizontal position may be indicated by an x-axis value (e.g., as indicated by a pixel value) of the upper left corner of the two-dimensional element. A vertical position refers to a vertical position or a desired vertical position (e.g., along the y-axis) of a point of an element relative to the display screen or background content. For instance, a vertical position may be indicated by a y-axis value (e.g., as indicated by a pixel value) of the upper left corner of the element. A depth position refers to a depth position or desired depth position of an element relative to the display screen or background content. A depth position may be indicated by a distance (e.g., as indicated by a pixel value along the z-axis) at which an element is desired to appear relative to the display screen. In embodiments, a depth position is not a z-order but is used to indicate a particular position, depth, or distance in three-dimensional space that an element is to be positioned or appear along the z-axis relative to a predetermined position (e.g., background content or display screen equal to zero).

A width refers to a width or desired width of an element, and a height refers to a height or desired height of an element. As can be appreciated, a width and/or height can be identified using any measurement, including a pixel value, inches, centimeters, etc. A left boundary refers to a position or desired position of a left side or boundary of an element (e.g., along the x-axis) relative to the display screen or background content. A right boundary refers to a position or desired position of a right side or boundary of an element (e.g., along the x-axis) relative to the display screen or background content. In this regard, a left boundary and a right boundary are the outer side boundaries of an element as though the element is positioned coplanar with the display screen or background content (i.e., has a depth position of zero). Stated differently, a boundary is a position or coordinate of an outer perimeter of an element having a perpendicular two-dimensional projection. Such boundaries may be indicated by a pixel value along the x-axis of the display screen or background content. As such, in embodiments, a horizontal position, as indicated by a pixel value along the x-axis, is the same as the left boundary, as indicated by a pixel value along the x-axis.

An enhanced attribute refers to an element attribute that has been modified to result in a modified size and/or modified placement of an element relative to a display screen or background content such that an overlay of the element sized and/or placed in accordance with such enhanced attributes provides a three-dimensional effect relative to media content. For example, a modified right boundary refers to a position or desired position of a right side or boundary of an element (e.g., along the x-axis) relative to the display screen or background content when an element having a particular depth position is projected back to the display screen. Similarly, a modified left boundary refers to a position or desired position of a left side or boundary of an element (e.g., along the x-axis) relative to the display screen or background content when an element having a particular depth position is projected back to the display screen. In this regard, a modified left boundary and a modified right boundary are the outer side boundaries of an overlay element extended back to the display screen when the element is associated with a depth position that extends outward from the display screen or background content (i.e., has a depth position greater than zero). Such modified side boundaries may be indicated by a pixel value along the x-axis of the display screen or background content. As a left-eye view and a right-eye view have different perspectives related to an element having a particular depth position, a left-eye view may be associated with a left boundary and a right boundary, while a right-eye view may be associated with a different left and right boundary.

A visual attribute describes, characterizes, or indicates a visual perception of a viewer. A viewer refers to an individual that is or will be viewing a three-dimensional environment. A visual attribute may be, for example, an eye distance, a visual depth, a viewport width, an eye position, or the like. An eye distance refers to a distance between a viewer's left eye and right eye. An eye distance may describe the distance between the inner portions of the eyes, the centers of the eyes, the outer portions of the eyes, or any other portion of the eyes. In some embodiments, an eye distance corresponding with a viewer may be provided by the viewer to provide a unique and appropriate experience for that viewer. In such cases, a viewer may enter or select an appropriate eye distance via a user interface, for example, in association with the viewer device. In alternative embodiments, an eye distance may be a standard or default eye distance that is generally appropriate for viewers. For example, an average eye distance may be determined and, thereafter, utilized as the eye distance. In an alternative embodiment, an eye distance can be synthesized to represent a value larger than a typical eye distance to exaggerate the three-dimensional effect.

A visual depth refers to a depth or distance between the screen display and a viewer (e.g., a viewer's eyes). Similar to an eye distance, in some embodiments, a visual depth may be provided by a viewer (e.g., generally or in association with each viewing instance) to provide a unique and appropriate experience for the viewer. Accordingly, a viewer may enter or select an appropriate visual depth at which the viewer expects or intends to be positioned relative to the display screen, for example, using a user interface associated with the viewer device. Alternatively, a visual depth may be a standard or default visual depth that is generally appropriate for viewers. In other embodiments, a visual depth can be calculated based on a three-dimensional camera system or other technology to compute an actual depth from the screen to the user. In some cases, a visual depth may be dependent on the type of display screen or display screen size in association with a viewer device, such as viewer device. For example, a mobile handheld device may have a smaller visual depth (e.g., 12 inches) than a desktop computer (e.g., 24 inches), which may have a smaller visual depth than a television (e.g., eight feet).

A viewport width refers to a width of the display screen or a viewable portion of the display screen. A viewport width may also be input by a user, such as a viewer, or may be based on the viewer device, as indicated by a user or the device itself. As can be appreciated, in some embodiments, visual attributes, such as eye distance, visual depth, and/or viewport width, can be determined, for example, by the graphics engine or another component. For example, a video camera in association with the viewer device may capture video including the viewer. Such video may be provided for processing to dynamically determine an eye distance of the particular viewer and/or a visual depth for the particular viewer.

An eye position refers to an eye position of the left eye or an eye position of the right eye. In some embodiments, such an eye position is indicated in accordance with a position or distance along an x-axis. Eye position calculations, as further discussed below, can be utilized to determine or approximate an eye position for the left eye and the right eye.

As can be appreciated, such attributes may be designated using any method. In some embodiments, pixels are utilized to designate a size and/or position of an element. Using a common measurement, such as pixels, enables a simpler calculation to generate a three-dimensional effect. In other embodiments, other measurements may be utilized (e.g., inches, centimeters, millimeters, etc.).

Element attributes, enhanced attributes, and/or visual attributes may be identified based on the corresponding element, a composite media (i.e., a composite or aggregate of an element positioned as an overlay relative to background content), or the like. In this regard, an element may be analyzed to identify one or more of a horizontal position, a vertical position, a depth position, a width, a height, a left boundary, a right boundary, etc. For example, a width and height may be determined upon analysis of an element. Alternatively, an element may be analyzed in association with the background content of which is overlays to identify one or more of a horizontal position, a vertical position, a depth position, a width, a height, a left boundary, a right boundary, etc. For example, a horizontal position and a vertical position may be identified upon analysis of a composite media (e.g., an element composited with background content). In some embodiments, one of more element attributes may be identified based on user input, for instance, provided by a viewer, a program coordinator, a program developer, a system administrator, or the like. For instance, a system administrator may provide input indicating a desired depth position for a particular element.

As can be appreciated, the three-dimensional presenting component 702 can present a three-dimensional environment in any manner that creates a three-dimensional effect. As previously described, to provide a three-dimensional effect, in some embodiments, a composite media that includes an enhanced element associated with a left-eye view and an enhanced element associated with a right-eye view is generated. In this regard, the enhanced element associated with the left-eye view and the enhanced element associated with the right-eye view are included in a same portion of the media content, such as a particular frame of media content. Alternatively, a composite media that includes an enhanced element associated with a left-eye view and a separate composite media that includes an enhanced element associated with a right-eye view can be generated. In such a case, the composite media associated with the left-eye view and the composite media associated with the right-eye view may include the same portion of media content (i.e., the same frame of media content repeated in two different composite media).

The selector-depth determining component 704 is configured to determine depth positions at which to present selectors. As previously described, a depth position refers to a depth position or desired depth position relative to the display screen or background content. A selector depth position may be indicated by a distance (e.g., as indicated by a pixel value along the z-axis) at which a selector is desired to appear relative to the display screen or background content.

In implementation, a selector depth position can be determined at various instances including, for example, upon an initial rendering of the selector or three-dimensional environment, upon a movement of the selector, upon an indication to move the selector, upon movement of an overlay element, upon an indication to move an overlay element, upon a lapse of an amount of time, or the like. By way of example only, assume that a selector is to be initially rendered on the display screen at a first position. In such a case, the selector-depth determining component 704 may determine the depth at which to present the selector. Now assume that, at a later instance, the user provides an indication to move the selector along the x-axis and/or y-axis. In such a case, the depth at which to present the selector may again be determined.

In one embodiment, the depth position at which to present a selector is determined based on the depth of an element having the same or similar vertical and/or horizontal position as the selector. In this regard, the depth of the selector corresponds with the perceived depth of the element located at substantially the same two-dimensional position as the selector and having the greatest depth from among the elements located at that position. Accordingly, if a selector is aligned with two elements having varying depth positions, the depth position of the selector inherits the depth position of the element having the greatest or largest depth from the display screen such that the selector appears to be coplanar with the element over which it is hovering.

Various methods may be employed to implement such an embodiment. In one implementation, a current selector position is identified. That is, a current position of a selector is identified. Such a current position can be identified using, for instance, a horizontal position, a vertical position, and/or a depth position. As can be appreciated, in some cases, a horizontal position and a vertical position are utilized to identify a current position of a selector.

In such an implementation, depth positions associated with elements are referenced. In some cases, a depth position associated with each element matching the horizontal and vertical position of the selector is referenced. In other words, a depth position is referenced for each element being positioned at, or near, the current position of a selector. For instance, assume that a selector is positioned at x-axis coordinate of 200 and a y-axis coordinate of 100. In such a case, any element, or portion thereof, positioned at the x-axis coordinate of 200 and the y-axis coordinate 100 is identified and the corresponding depth position is referenced. By way of example only, a depth position for each element may be referenced by looking up the depth position of the element from a lookup table or index or may be referenced from a depth position attribute attached to the element.

As can be appreciated, a depth position for an element can be determined or calculated using any method, for example using a full three-dimensional transform, and thereafter referenced. Such a depth position may be determined or identified by the selector-depth determining component 704, or by another component, such as a component that determines depth of elements prior to presenting the three-dimensional environment. Alternatively, a depth position for an element may be received, for example, from a viewer, a system administrator, a system programmer, a system developer, or the like. A system administrator, a system programmer, a system developer, or a viewer may provide a depth position via any computing device. By way of example only, and not limitation, a system developer may view background content and determine a particular position at which to overlay a particular element. As such, the developer may provide a depth position at which an element should appear relative to the display screen or background content.

The greatest or largest depth position (i.e., furthest from the display screen) corresponding with an element that aligns with the selector (e.g., via an x-axis and y-axis position) is identified. The depth position of the selector is designated, assigned, identified, determined, or set in accordance with such a depth. In some cases, the depth position of the selector matches or is equal to the greatest or largest depth position among the elements having the same position. In other cases, the depth position of the selector may be offset, for example, by a predetermined amount relative to the greatest or largest depth position of the corresponding element. For instance, the depth position for the selector might be determined to be a particular distance (e.g., one pixel), a particular distance ratio, etc., greater or larger than the greatest or largest depth position of the corresponding element such that the selector appears in front of the element (rather than coplanar with the element).

Figure 8A:
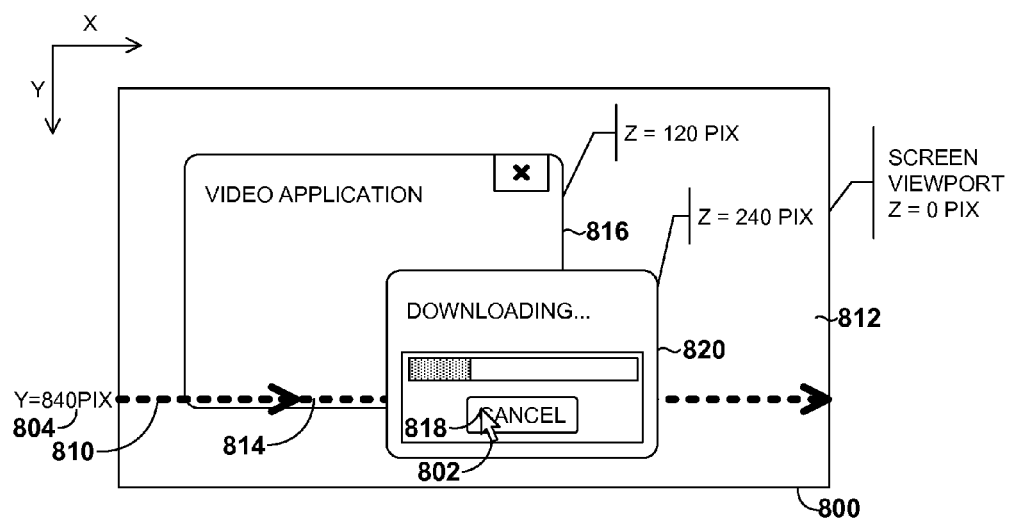
FIG. 8A depicts an illustrative display screen of a selector being displayed in connection with elements having different depth positions, in accordance with embodiments of the present invention.
Figure 8B:
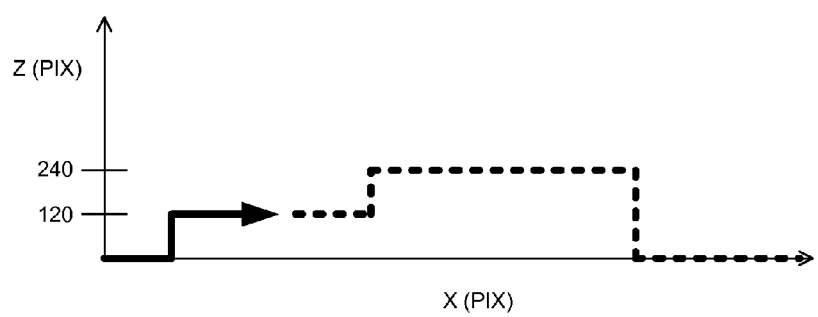
FIG. 8B is a graph that illustrates different depth positions acquired by a selector, according to embodiments of the present invention.

By way of example only, FIG. 8A illustrates a cursor 802 being moved across the display screen 800 at a vertical position 804 (i.e., y=840 pixels). As the cursor moves over across the display screen 800, the cursor obtains the depth position of the element the cursor is directly positioned over. That is, the cursor acquires the depth position of the element having the greatest depth position that aligns with the cursor 802. Accordingly, when the cursor 802 is positioned at cursor position 810, the cursor has a depth position of zero pixels that corresponds with the depth position of the background content 812. As the cursor 802 moves across the display screen 800 and is positioned at cursor position 814 over the first window 816, the cursor has a depth position of 120 pixels that corresponds with the depth position of the first window 816. Assume now that the cursor 802 continues to move across the display screen 800 to the cursor position 818 over the second window 820. In such a case, the cursor 802 has a depth position of 240 pixels that corresponds with the depth position of the second window 820. FIG. 8B is a graph that illustrates the depth positions acquired by the cursor 802 of FIG. 8A as the cursor 802 moves across the display screen 800 of FIG. 8A.

In some instances of this embodiment, the selector may disappear or not be visible as the selector moves across the display screen as it may temporarily be obscured by an element having a higher depth position. An obscured region, as used herein, refers to a region or area of the display screen that is obscured by an element provided at a depth position greater than another element such that the particular region is obscured to a viewer (e.g., a left-eye perspective of a viewer, a right-eye perspective of a viewer, or a combination thereof). In some embodiments, an obscured region may be obscured relative to a single eye view (i.e., a left-eye view or a right-eye view). In other embodiments, an obscured region may be obscured relative to both the left and the right eye. In yet other embodiments, a portion of an obscured region may be obscured relative to a single eye view while another portion of the obscured region may be obscured relative to both the left and the right eye. For instance, an obscured region might be a region that is not directly behind a particular element (e.g., when a two-dimensional element is perpendicularly projected back to the background content or display screen) but the element nonetheless obscures the region from a left-eye view and/or a right-eye view based on the element appearing a depth distance from the background content or display screen.

Figure 9A:
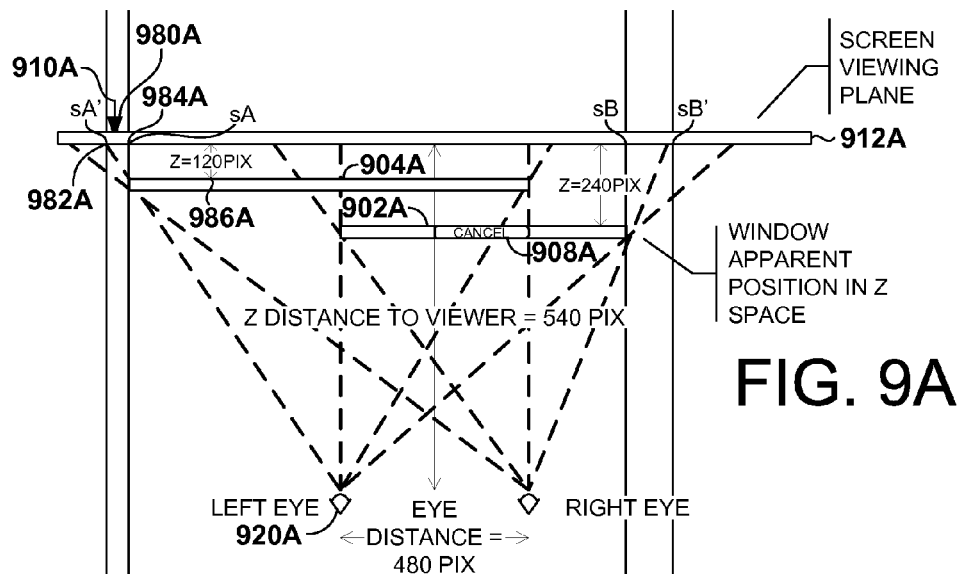
FIG. 9A illustrates a representation of a top view of a viewer's perception of a three-dimensional environment having obscured regions, according to embodiments of the present invention.

By way of example, FIG. 9A illustrates a top view from the left-eye view and the right-eye view. In particular, FIG. 9A illustrates a projection, from the perspective of the left eye 920A of the first window 902A, the second window 904A, and the selectable item 908A back onto the screen viewing plane 912A. Assume that the selector 910A is positioned at selector location 980A. As illustrated in FIG. 9A, the selector location 980A is between the modified left boundary 982A (sA') for the left eye 920A (i.e., the left boundary of the second window 904A as modified based on the viewing perspective of the left eye) and the left boundary 984A (sA) for the left side of the second window 904A. Although the selector 910A at selector location 980A is outside of the position of the second window 904A, the selector 910A, if presented at a depth position equal to the display screen or background content, will not be visible to a user due to the second window 904A appearing to have a depth position 986A removed from the display screen 912A. That is, the selector 910A will appear to a viewer as behind the second window 904A.

Because a three-dimensional environment may result in a selector being "hidden" by an element appearing protruded from the display screen, in another embodiment, the depth position of a selector located in an obscured region is adjusted such that the selector does not appear at an improper depth or appear obscured by an element. Various methods may be used to implement such an embodiment. In one implementation, the depth position of the selector may be modified so that it is not perceived as being behind an item. Alternatively or additionally, when a selector is positioned within an obscured region, the selector functionality may be modified such that an improper selection is not made. In this regard, the selector may be disabled such that selections in obscured regions are not available. Disabling selection functionality when the selector is located in an obscure area can minimize the likelihood of a viewer clicking an undesired selectable item that is within an obscured region and not visible to the viewer.

Figure 9B:
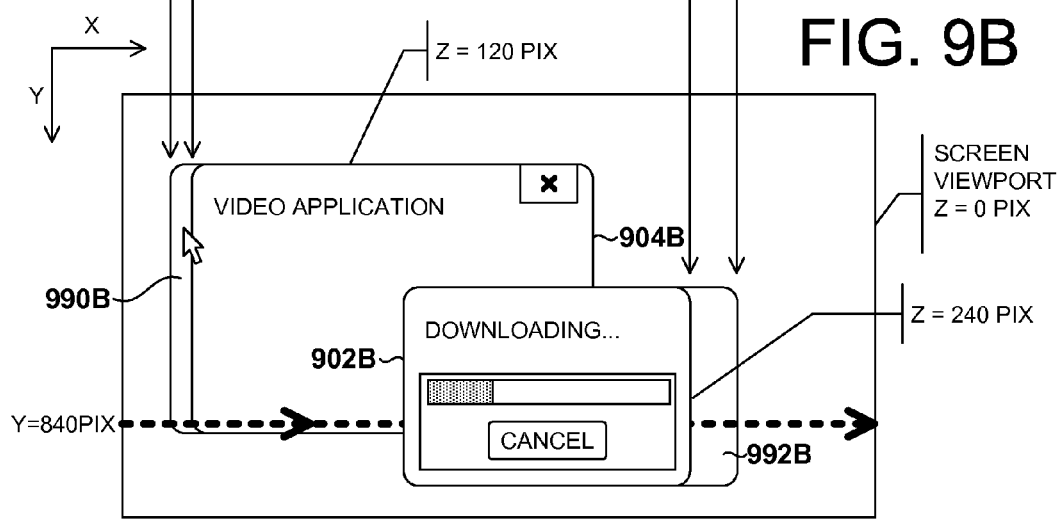
FIG. 9B depicts an illustrative display screen of a selector being displayed in an obscured region, in accordance with embodiments of the present invention.
Figure 9C:
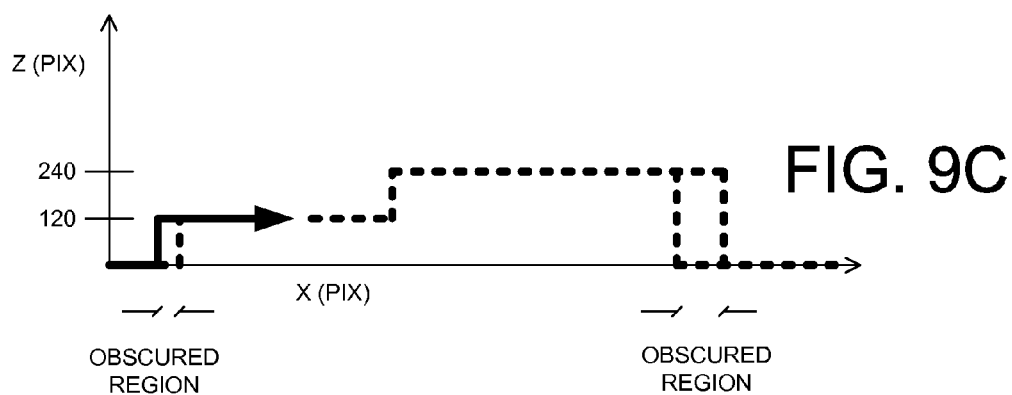
FIG. 9C is a graph that illustrates different depth positions acquired by a selector, according to embodiments of the present invention.

By way of example and with reference to FIG. 9B, when a selector is within a first obscured region 990B or within a second obscured region 992B, the selector may be disabled such that any items within the first obscured region 990B or the second obscured region 992B cannot be selected. Alternatively or additionally, when the selector is within the first obscured region 990B or within the second obscured region 992B, the selector may be assigned a depth position of a nearby element such that the selector is visible to the viewer. In this regard, when the selector is within the first obscured region 990B, the selector may be identified as having a depth position that matches the second window 904B of 120 pixels. Similarly, when the selector is within the second obscured region 992B, the selector may be identified as having a depth position that matches the first window 902B of 240 pixels. FIG. 9C is a graph that illustrates the depth positions acquired by the selector of FIG. 9B as the cursor moves across the display screen of FIG. 9B.

In such implementations, obscured regions within a display screen are determined or identified. An obscured region can be designated in any manner, such as, for example, one or more pixel values, one or more pixel ranges, an array, coordinates, etc. In some embodiments, obscured regions are determined by determining the area between an element boundary and a corresponding modified element boundary. As previously described, an element boundary refers to an original position at which an element resides relative to a display screen or background content (e.g., if presented in a two-dimensional environment or projected straight back onto the display screen). A modified boundary refers to a position at which an element is projected back onto the display screen from a particular eye perspective.

Such element attributes and/or enhanced element attributes (e.g., boundaries and modified boundaries) may be referenced. Attributes can be referenced by receiving, obtaining, accessing, retrieving, determining, identifying, recognizing, a combination thereof, or the like, such attributes. As previously discussed, one or more attributes may be received by a content provider, a viewer (e.g., via the end-user device 606), a system administrator, a system programmer, a system developer, or the like. A system administrator, a system programmer, a system developer, or a viewer may provide an element attribute via any computing device. By way of example only, and not limitation, a system developer may view media content and determine a particular position at which to overlay a particular element. As such, the developer may provide a left element boundary and a right element boundary associated with an element. By way of further example, a program developer or a viewer may provide a depth position at which an element should appear relative to the display screen or background content.

To determine or identify attributes, an element(s) or a composite media (i.e., including an element and background content) may be analyzed. Such analysis may result in identification of attributes, such as, for example, a left element boundary, a right element boundary, a left modified boundary, a right modified boundary, or the like. For instance, an original element may be composited with media content and, thereafter, analyzed to determine a left element boundary, a right element boundary, a left modified boundary, a right modified boundary, or the like.

In embodiments, one or more element attributes and one or more visual attributes are utilized to calculate one or more enhanced attributes (e.g., a modified boundary). One or more enhanced attributes may be calculated in association with a left-eye view, and one or more enhanced attributes may be calculated in association with a right-eye view. Such enhanced attributes associated with a left-eye view and enhanced attributes associated with a right-eye view can be used to generate one or more enhanced elements (i.e., a two-dimensional element modified in accordance with enhanced attributes) and/or one or more enhanced composite media (i.e., an enhanced element composited with media content).

Alternatively or additionally, one or more attributes may be referenced from a data store, such as data store (e.g., a database). For example, a depth position may be stored in data store and referenced therefrom. In such a case, a single depth position may be stored within database or a depth position may be associated with a particular element(s). Such information stored within a data store, such as data store, may be automatically determined by a computing device (e.g., via an algorithm and/or analysis of an element or composite media) or may be input by a user (e.g., a programmer, a developer, an administrator, a viewer, etc.).

To determine an appropriate selector depth position and/or selector functionality, a current selector position is also identified. That is, a current position of a selector is identified. Such a current position can be identified using, for instance, a horizontal position, a vertical position, and/or a depth position. As can be appreciated, in some cases, a horizontal position and a vertical position are utilized to identify a current position of a selector. Based on the current selector position and the determined obscured region(s), it is determined if the selector is within an obscured region.

In some embodiments, when the selector is within an obscured region, a depth position of the selector is determined. The selector may be assigned a depth position that matches, equals, or corresponds with the depth of a nearby element or the element that causes the obscured region. Such an embodiment prevents the selector from being obscured by an element such that the selector is continuously viewable by the viewer. In this regard, when a selector is moved (i.e., a move event is generated), it is determined if the selector is within an obscured region. If so, the selector may given a depth position of the element resulting in the obscured region so that the selector is displayed at a greater depth position than the current depth position of the selector so as not to provide a user perception of being behind an element. In this way, when a selector is positioned in an obscured region, it is not provided with the same depth position of the background content or another underlying element, but rather is provided with the same depth position of a nearby element or the element that causes the obscured region.

In additional or alternative embodiments, when the selector is within an obscured region, the selection functionality of the selector is disabled such that any clicks or selections are not recognized and/or applied. In accordance with such an implementation, when a selector is moved (i.e., a move event is generated), it is determined if the selector is within an obscured region. If so, the click or selection functionality may be disabled to avoid inadvertent selection of a selectable item in the obscured region.

By contrast, when it is determined that the selector is not within an obscured region, the selection functionality may be enabled and/or the selector may be given a depth position that equals the greatest depth position of an element that the selector overlays, as described more fully above.

The selector presenting component 706 is configured to present selectors in accordance with an identified depth position and/or an appropriate selector functionality. In one embodiment, selectors are presented by displaying such selectors in association with one or more elements to a user via a user interface. In another embodiment, selectors are presented by communicating data associated with the selector to another computing device. Selector data may include a depth position at which to display a selector, enablement or disablement of selection functionality, etc. For example, a depth position and/or selection functionality may be communicated to a user device, such as user device 606 of FIG. 6, such that the user device can utilize the data to display a selector in an appropriate position via a display screen of a user device and/or to display a selector having appropriate functionality.

In one embodiment, the selector presenting component 706 might present the selector, or data associated therewith, upon detecting or recognizing an initial presentation of a selector or element(s), a move event of a selector, a move event of an element(s), a combination thereof, or the like.

Figure 10:
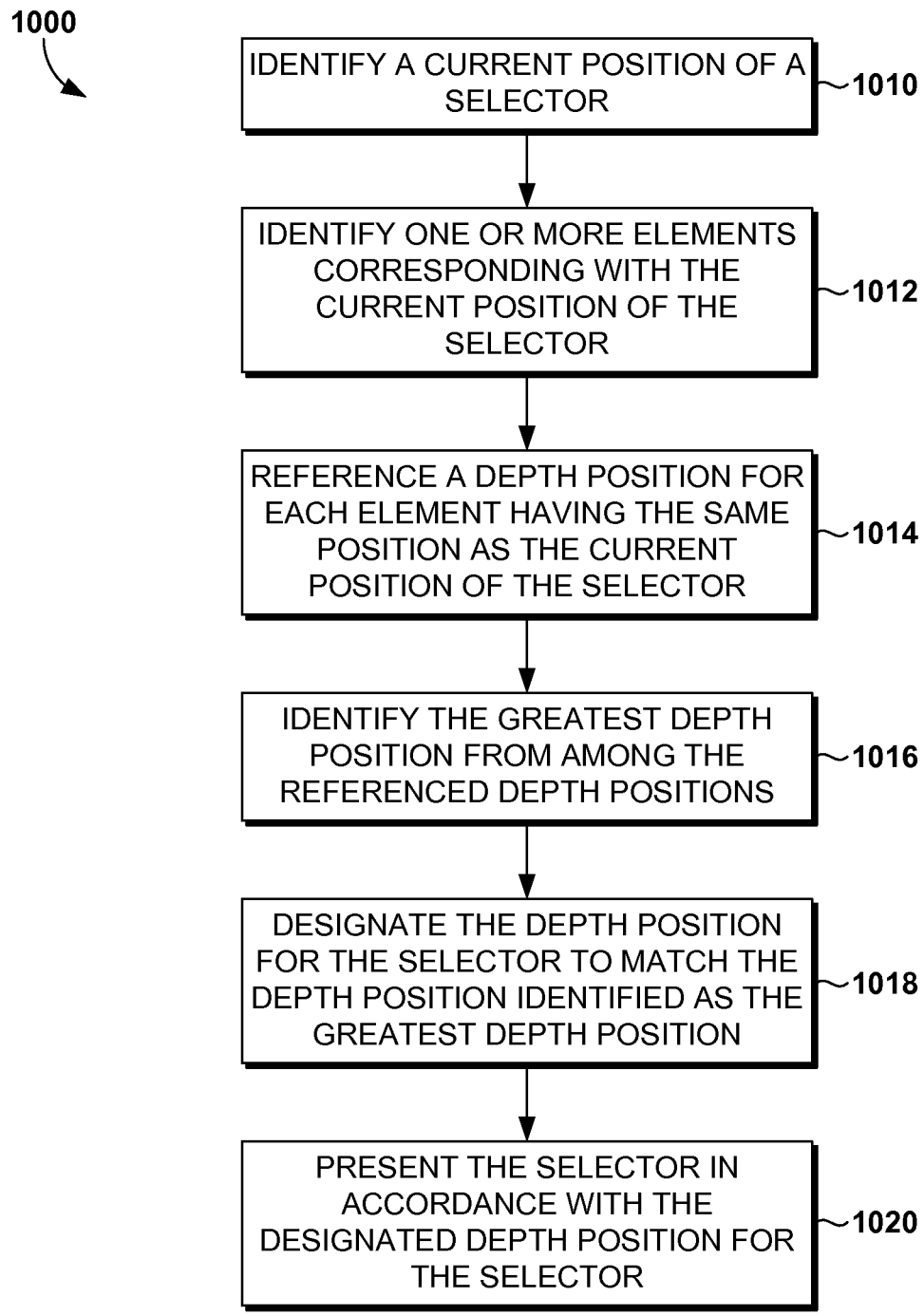
FIG. 10 is a flow diagram depicting a first illustrative method for presenting selectors within three-dimensional environments in accordance with embodiments of the present invention.

To recapitulate, embodiments of the invention include systems, machines, media, methods, techniques, processes and options for presenting selectors within three-dimensional environments. Turning to FIG. 10, a flow diagram is illustrated that shows an exemplary method 1000 for presenting selectors within three-dimensional environments, according to embodiments of the present invention. In some embodiments, aspects of embodiments of the illustrative method 1000 can be stored on computer-readable media as computer-executable instructions, which are executed by a processor in a computing device, thereby causing the computing device to implement aspects of the method 1000. The same is, of course true, with the illustrative methods 1100, 1200, and 1300 depicted in FIGS. 11, 12, and 13, respectively, or any other embodiment, variation, or combination of these methods.

Initially, at block 1010, a current position of a selector is identified. In embodiments, a current position of a selector includes an x-axis position and a y-axis position of the location of the selector relative to the display screen or background content. At block 1012, one or more elements corresponding with the current position of the selector are identified. In this regard, elements that have or include the same position of the selector is recognized. At block 1014, a depth position for each element having the same position as the current position of the selector is referenced. The greatest depth position from among the referenced depth positions is identified, as indicated at block 1016. Subsequently, at block 1018, the depth position of the selector is designated or assigned to match the depth position identified as the greatest corresponding depth position. At block 1020, the selector is presented in accordance with the depth position designated or assigned to the selector.

Figure 11:
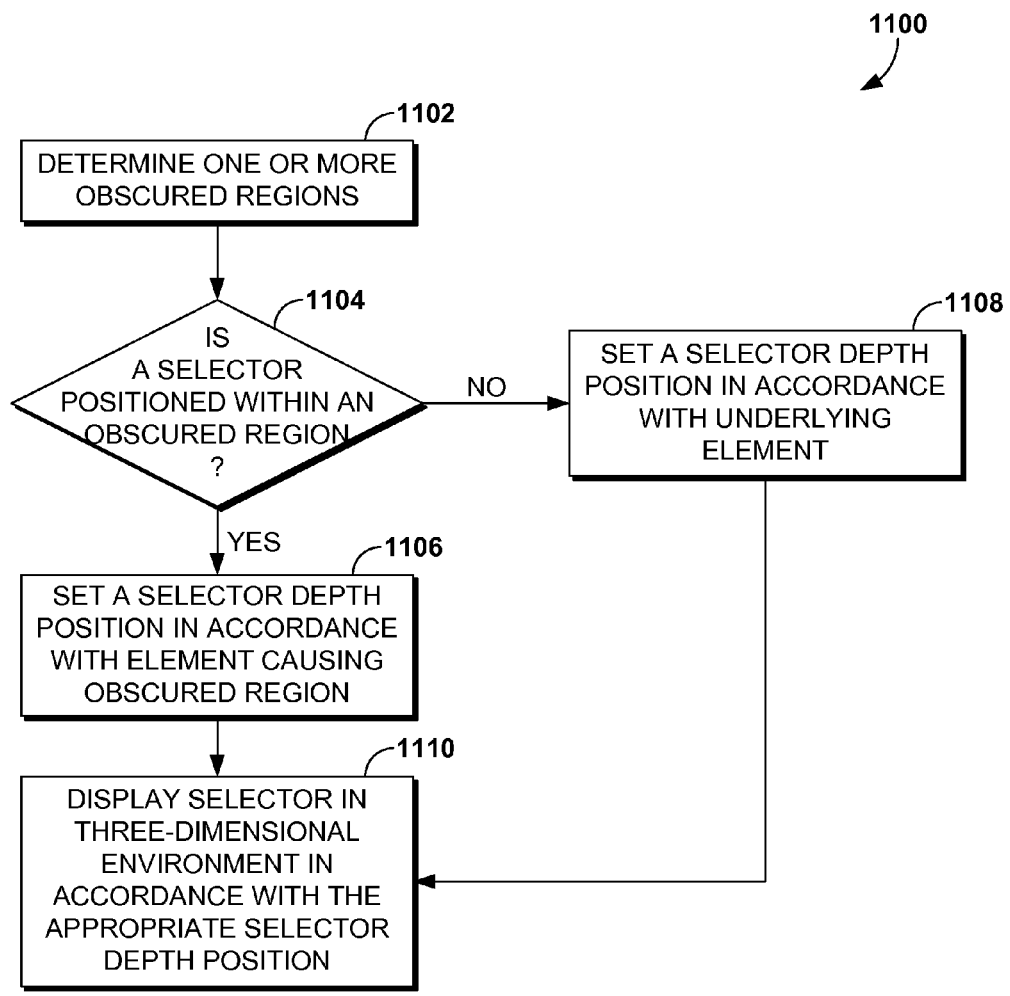
FIG. 11 is a flow diagram depicting a second illustrative method for presenting selectors within three-dimensional environments in accordance with embodiments of the invention.

Turning now to FIG. 11, another flow chart depicts an illustrative method 1100 of presenting selectors within three-dimensional environments, in accordance with embodiments of the present invention. Initially, at block 1102, one or more obscured regions are determined. An obscure region can be determined using any method that identifies portions of a display screen or background content that are obscured, for example, due to an element displayed to appear projected from the display screen. At block 1104, it is determined if a selector is positioned within an obscured region. As such, a selector position, for example along an x-axis and a y-axis, may be identified and, thereafter, compared to one or more obscured regions to determine if the selector is positioned with an obscured regions. If it is determined that the selector is positioned within an obscured region, a depth position for the selector is set in accordance with a depth position associated with the element causing the obscured region. This is indicated at block 1106. In some embodiments, a selector depth position is matched to the depth position corresponding with the element causing the obscured region. At block 1110, the selector is displayed in a three-dimensional environment in accordance with the appropriate selector depth position.

If, on the other hand, it is determined that the selector is not positioned within an obscured region at block 1104, a depth position for the selector is set in accordance with a depth position associated with an element underlying the selector. This is indicated at block 1108. In embodiments, the depth position for the selector matches the depth position of an underlying element having the greatest or largest depth position. Thereafter, at block 1110, the selector is displayed in a three-dimensional environment in accordance with the appropriate selector depth position.

Figure 12:
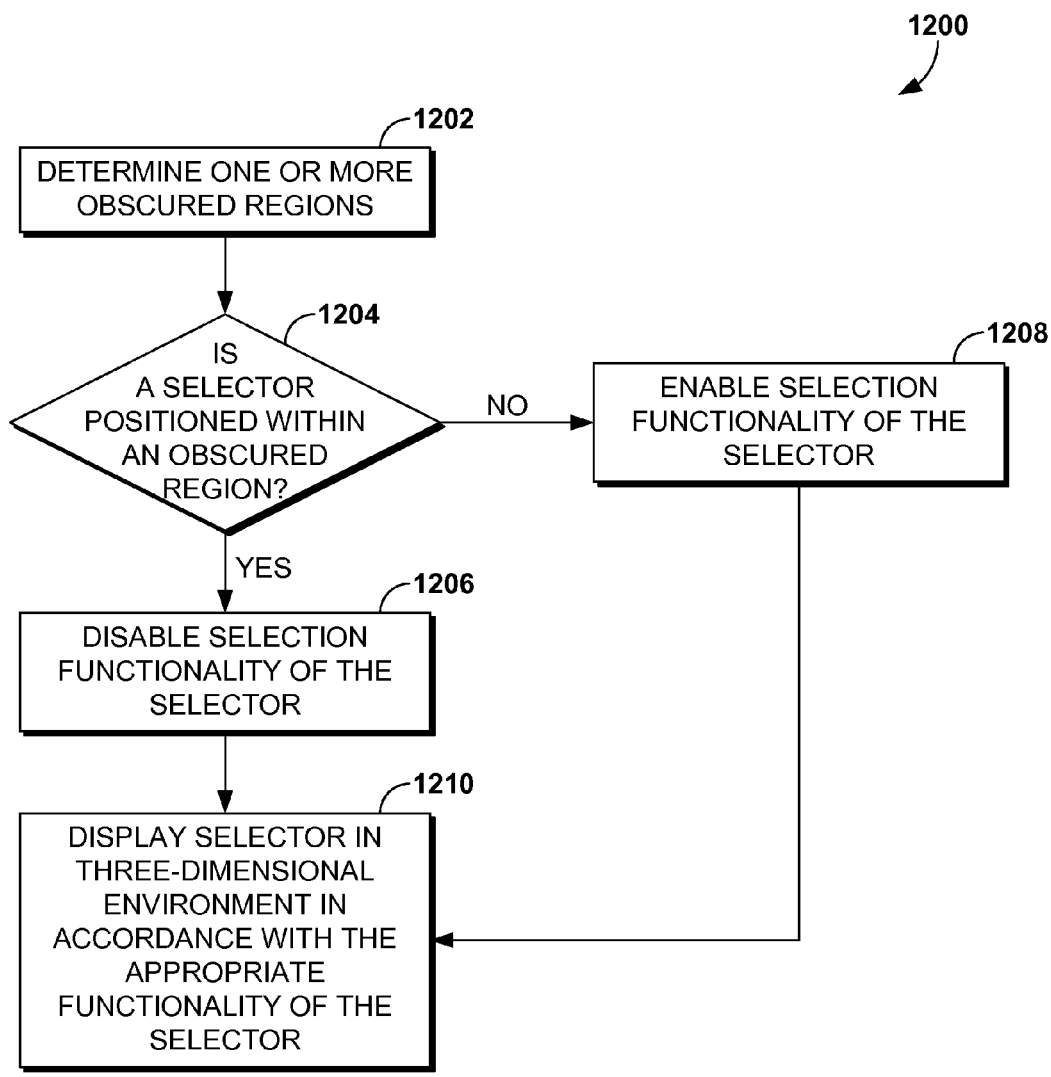
FIG. 12 is a flow diagram depicting a third illustrative method for presenting selectors within three-dimensional environments in accordance with embodiments of the invention.

Turning now to FIG. 12, another flow chart depicts an illustrative method 1200 of presenting selectors within three-dimensional environments, in accordance with embodiments of the present invention. Initially, at block 1202, one or more obscured regions are determined. An obscure region can be determined using any method that identifies portions of a display screen or background content that are obscured, for example, due to an element displayed to appear projected from the display screen. At block 1204, it is determined if a selector is positioned within an obscured region. As such, a selector position, for example along an x-axis and a y-axis, may be identified and, thereafter, compared to one or more obscured regions to determine if the selector is positioned with an obscured regions. If it is determined that the selector is positioned within an obscured region, selection functionality of the selector is disabled, as indicated at block 1206. Accordingly, if a user provides an indication of a selection when the selector is within an obscured region, such a selection is not recognized and/or applied. At block 1210, the selector is displayed in a three-dimensional environment in accordance with the appropriate functionality of the selector.

If, on the other hand, it is determined that the selector is not positioned within an obscured region at block 1204, selection functionality of the selector is enabled. This is indicated at block 1208. Thereafter, at block 1210, the selector is displayed in a three-dimensional environment in accordance with the appropriate functionality of the selector.

Figure 13:
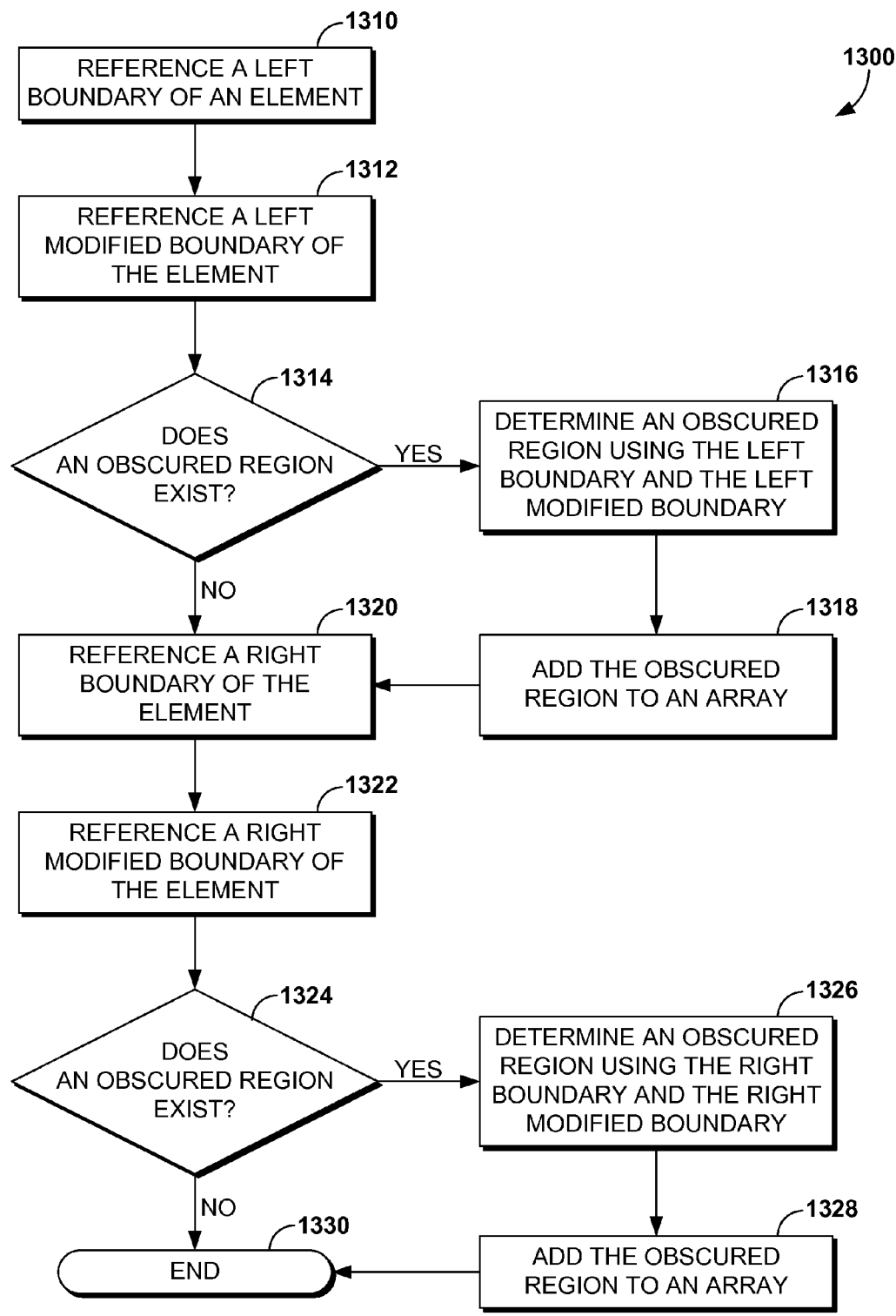
FIG. 13 is a flow diagram depicting an illustrative method for determining obscured regions in accordance with embodiments of the invention.

FIG. 13 provides a flow chart that depicts an illustrative method 1300 for determining obscured regions associated with an element, in accordance with embodiments of the present invention. Initially, at block 1310, a left boundary of an element is identified or referenced. In embodiments, an x-coordinate for a left perimeter of an element is identified, determined, referenced, or calculated. In some cases, a left boundary of an element is calculated using attributes of the element, such as height of the element, vertical screen position of the element, depth position (i.e., z offset), and/or the like. At block 1312, a left modified boundary of the element is identified or referenced. In embodiments, an x-coordinate for the left perimeter of the element associated with a particular depth position as perceived by an eye-perspective is identified, determined, referenced, or calculated. In some cases, a modified boundary of an element is calculated using attributes of the elements, such as height of the element, vertical screen position of the element, depth position (i.e., z offset), and/or the like. In some embodiments, a left modified boundary for a particular eye perspective may be determined. That is, the left modified boundary associated with the left-eye perspective might be determined. In other embodiments, a left modified boundary for a left-eye perspective and a right-eye perspective might be determined. For instance, a left modified boundary associated with the left-eye perspective and a left modified boundary associated with the right-eye perspective might be determined.

At block 1314, it is determined if an obscured region exists in association with the left portion of the element. In embodiments that a modified boundary associated with both a left-eye perspective and a right-eye perspective are determined, one of the modified boundaries may be selected for use in determining if an obscured region exists. For example, the modified boundary furthest away from the boundary may be utilized along with the boundary to determine an obscured region. In some embodiments, such a determination of an obscured region may be made by comparing the left boundary and left modified boundary. For example, if the modified left boundary has a smaller x-coordinate than the left boundary, then it may be determined that an obscured region exists. By way of further example, if the modified left boundary is further from the center of the display screen or background content than the left boundary, a determination may be made that an obscured region exists.

If it is determined that an obscured region exists, the boundary and corresponding modified boundary of the element are used to determine an obscured region, as indicated at block 1316. In embodiments that a modified boundary associated with both a left-eye perspective and a right-eye perspective are determined, one of the modified boundaries may be selected for use in determining an obscured region. For example, the modified boundary furthest away from the boundary may be utilized along with the boundary to determine an obscured region. As can be appreciated, an obscured region can be identified in any manner. For instance, an x-coordinate, a y-coordinate, a z-coordinate, a width or distance between the boundary and a modified boundary, a height, a depth position, and/or the like may be used to identify an obscured region. Such an obscured region is added to an array such that a selector being positioned within such an obscured region can be recognized. This is indicated at block 1318.

If it is determined that an obscured region does not exist at block 1314 or upon adding an obscured region to an array at block 1318, a right boundary of an element is referenced. This is indicated at block 1320. In embodiments, an x-coordinate for a right perimeter of an element is identified, determined, referenced, or calculated. In some cases, a right boundary of an element is calculated using attributes of the element, such as height of the element, vertical screen position of the element, depth position (i.e., z offset), and/or the like. At block 1322, a right modified boundary of the element is referenced. In embodiments, an x-coordinate for the right perimeter of the element associated with a particular depth position as perceived by an eye-perspective is identified, determined, referenced, or calculated. In some cases, a modified boundary of an element is calculated using attributes of the elements, such as height of the element, vertical screen position of the element, depth position (i.e., z offset), and/or the like. In some embodiments, a right modified boundary for a particular eye perspective may be determined. That is, the right modified boundary associated with the right-eye perspective might be determined. In other embodiments, a right modified boundary for a left-eye perspective and a right-eye perspective might be determined. For instance, a right modified boundary associated with the left-eye perspective and a right modified boundary associated with the right-eye perspective might be determined.

At block 1324, it is determined if an obscured region exists in association with the right portion of the element. In embodiments that a modified boundary associated with both a left-eye perspective and a right-eye perspective are determined, one of the modified boundaries may be selected for use in determining if an obscured region exists. For example, the modified boundary furthest away from the boundary may be utilized along with the boundary to determine an obscured region. In some embodiments, such a determination of an obscured region may be made by comparing the right boundary and right modified boundary. For example, if the modified right boundary has a larger x-coordinate than the right boundary, then it may be determined that an obscured region exists. By way of further example, if the modified right boundary is further from the center of the display screen or background content than the right boundary, a determination may be made that an obscured region exists.

If it is determined that an obscured region exists, the boundary and corresponding modified boundary of the element are used to determine an obscured region, as indicated at block 1326. In embodiments that a modified boundary associated with both a left-eye perspective and a right-eye perspective are determined, one of the modified boundaries may be selected for use in determining an obscured region. For example, the modified boundary furthest away from the boundary may be utilized along with the boundary to determine an obscured region. As can be appreciated, an obscured region can be identified in any manner. For instance, an x-coordinate, a y-coordinate, a z-coordinate, a width or distance between the boundary and a modified boundary, a height, a depth position, and/or the like may be used to identify an obscured region. Such an obscured region is added to an array such that a selector being positioned within such an obscured region can be recognized. This is indicated at block 1328. If it is determined that an obscured region does not exist at block 1324 or upon adding an obscured region to an array at block 1328, the method ends at block 1330.

Various embodiments of the invention have been described to be illustrative rather than restrictive. Alternative embodiments will become apparent from time to time without departing from the scope of embodiments of the inventions. It will be understood that certain features and sub-combinations are of utility and may be employed without reference to other features and sub-combinations. This is contemplated by and is within the scope of the claims.

The invention claimed is:

1. One or more hardware storage devices having embodied thereon computer-executable instructions that, when executed by a processor in a computing device, cause the computing device to perform operations that facilitate presentation of selectors in three-dimensional graphical environments, the operations comprising:
   referencing a depth position associated with each overlay element having a horizontal and a vertical position on a display screen that is the same as a current position of a selector on the display screen, wherein each depth position indicates a distance from the display screen at which the corresponding overlay element is intended to appear relative to the display screen, wherein each overlay element comprises a user interface element that overlays at least background content on the display screen;
   identifying a largest depth position having a largest depth relative to the display screen, wherein the largest depth position is identified from among the depth positions associated with each overlay element having the horizontal and the vertical position on the display screen that is the same as the current position of the selector on the display screen; and
   designating a selector depth position that corresponds with the largest depth position, the selector depth position indicating a distance from the display screen at which the selector is intended to appear relative to the display screen.

2. The hardware storage devices of claim 1 further comprising identifying the current position of the selector.

3. The hardware storage devices of claim 1 further comprising presenting the selector at the selector depth position that matches the largest depth position.

4. The hardware storage devices of claim 1 further comprising presenting the selector at the selector depth position that is a predetermined amount greater than the largest depth position.

5. The hardware storage devices of claim 1 further comprising using the current position of the selector to determine that the selector is not located within an obscured region being obscured to a viewer by a particular element appearing protruded from the display screen.

6. The hardware storage devices of claim 1 further comprising:
   using the current position of the selector to determine that the selector is located within an obscured region being obscured to a viewer by a particular overlay element appearing protruded from the display screen; and
   designating the selector depth position to correspond with a depth position of the particular overlay element causing the obscured region.

7. The hardware storage devices of claim 6 further comprising displaying the selector in accordance with the selector depth position that corresponds with the depth position of the particular overlay element causing the obscured region.

8. One or more hardware storage devices having embodied thereon computer-executable instructions that, when executed by a processor in a computing device, cause the computing device to perform operations that facilitate presentation of selectors in three-dimensional graphical environments, the operations comprising:
   determining an obscured region within a three-dimensional graphical environment, wherein the obscured region refers to a region of a display screen that is obscured by a first overlay element that is presented at a depth position in front of the display screen that is greater than one or more other overlay elements;
   identifying that a selector is located in the obscured region, the selector indicating a position within the three-dimensional graphical environment that is used to select selectable items; and
   disabling a selection functionality of the selector based on the selector being located in the obscured region, wherein disabling the selection functionality prevents the selector from initiating selection of any selectable items.

9. The hardware storage devices of claim 8 further comprising identifying a location of the selector.

10. The hardware storage devices of claim 8 further comprising adjusting a depth position for the selector that matches a depth position associated with the first overlay element.

11. The hardware storage devices of claim 10 further comprising referencing the depth position associated with the first overlay element.

12. The hardware storage devices of claim 8, wherein the obscured region is determined using an x-coordinate of a boundary of the first overlay element and an x-coordinate of a modified boundary of the first overlay element, the modified boundary of the first overlay element comprising a boundary extending from the first overlay element having a particular depth position as perceived by an eye-perspective to the display screen or background content.

13. The hardware storage devices of claim 12, wherein the boundary of the first overlay element comprises the left boundary of the first overlay element and the modified boundary of the first overlay element comprises the left modified boundary corresponding with the left-eye perspective.

14. The hardware storage devices of claim 12, wherein the boundary of the first overlay element comprises the left boundary of the first overlay element and the modified boundary of the first overlay element comprises the left modified boundary corresponding with the right-eye perspective.

15. A computerized method for facilitating presentation of selectors in three-dimensional graphical environments, the method comprising:
    determining an obscured region within a three-dimensional graphical environment, wherein the obscured region refers to a region of a display screen that is obscured by a first overlay element that is presented at a depth position in front of the display screen that is greater than one or more other overlay elements;
    identifying that a selector is located in the obscured region, wherein the selector comprises a cursor within the three-dimensional graphical environment that is used to select selectable items therein; and
    based on the selector being located in the obscured region, presenting the selector in accordance with the depth position of the first overlay element associated with the obscured region, the depth position indicating a distance in front of the display screen at which the first overlay element is intended to appear relative to the display screen.

16. The method of claim 15 further comprising preventing the selector from initiating selection of any selectable items within the obscured region.

17. The method of claim 15, wherein the obscured region comprises an area between a boundary of the first overlay element and a modified boundary of the first overlay element, the boundary being an x-coordinate of a position of the first overlay element when the first overlay element is perpendicularly projected back to the display screen and the modified boundary being an x-coordinate of a position of the first overlay element when the first overlay element is projected back to the display screen in accordance with a particular eye view.

18. The method of claim 17, wherein the particular eye view comprises a left-eye view or a right-eye view.

19. The method of claim 15 further comprising determining a position of the selector.

* * * * *